United States Patent [19]

Haruta et al.

[11] Patent Number: 4,481,244

[45] Date of Patent: Nov. 6, 1984

[54] MATERIAL USED TO BEAR WRITING OR PRINTING

[75] Inventors: Masahiro Haruta, Funabashi; Takashi Hamamoto, Yokohama; Shigeo Toganoh, Tokyo, all of Japan

[73] Assignee: Canon Kabushiki Kaisha, Tokyo, Japan

[21] Appl. No.: 459,987

[22] Filed: Jan. 21, 1983

[30] Foreign Application Priority Data

| | | | |
|---|---|---|---|
| Mar. 3, 1982 | [JP] | Japan | 57-16159 |
| Mar. 3, 1982 | [JP] | Japan | 57-16160 |
| Mar. 3, 1982 | [JP] | Japan | 57-16161 |
| Mar. 3, 1982 | [JP] | Japan | 57-16162 |
| Mar. 3, 1982 | [JP] | Japan | 57-16163 |
| Mar. 3, 1982 | [JP] | Japan | 57-16164 |
| Mar. 3, 1982 | [JP] | Japan | 57-16165 |
| Mar. 3, 1982 | [JP] | Japan | 57-16166 |

[51] Int. Cl.³ .......................... G01D 15/34; B32B 5/16; B32B 5/22

[52] U.S. Cl. .................................. 428/155; 346/135.1; 428/211; 428/316.6; 428/342

[58] Field of Search ............... 428/315.5, 315.7, 315.9, 428/316.6, 155, 211, 304.4, 342; 346/135.1

[56] References Cited

U.S. PATENT DOCUMENTS

| | | | |
|---|---|---|---|
| 3,190,765 | 6/1965 | Yuan | 428/315.5 |
| 3,377,191 | 4/1968 | Macnair | 428/315.5 |
| 3,922,427 | 11/1975 | Toyoda et al. | 428/315.5 |
| 4,346,142 | 8/1982 | Lazear | 428/315.7 |
| 4,371,582 | 2/1983 | Sugiyama et al. | 428/211 |
| 4,425,405 | 1/1984 | Murakami et al. | 428/342 |
| 4,440,827 | 4/1984 | Miyamoto et al. | 428/342 |
| 4,442,172 | 4/1984 | Oshima et al. | 428/211 |

FOREIGN PATENT DOCUMENTS 1007469 10/1965 United Kingdom .

*Primary Examiner*—William J. Van Balen

*Attorney, Agent, or Firm*—Fitzpatrick, Cella, Harper & Scinto

[57] ABSTRACT

A material used to bear writing or printing, which comprises a substrate and a coating layer formed thereon of a coating material containing a polymer having both hydrophilic segments and hydrophobic segments.

7 Claims, 7 Drawing Figures

50μm

50μm

50μm

50μm

50μm

MATERIAL USED TO BEAR WRITING OR PRINTING

BACKGROUND OF THE INVENTION

1. Field of the Invention

The present invention relates to materials on which images such as letters and figures are to be written or printed with a recording liquid. Hereinafter, the materials are simply referred to as recording materials or recording paper.

2. Description of the Prior Art

Recording with a recording liquid or ink has long been made by means of writing tools such as pens, fountain pens, felt pens, etc. Recently, so-called ink-jet recording systems have been developed, where ink is also utilized.

The ink-jet recording system makes a record by forming ink droplets with any of various ink-jetting processes (e.g. electrostatic attractive process, mechanical vibration or displacement process by use of piezoelements, bubbling process where bubbles are generated by impulsive heating, etc.), and leading parts or all of the droplets to adhere onto recording material such as paper.

For recording in such ways using liquid ink, ink is generally required not to blot on recording paper so that the printed letters or figures may not become obscure. The ink is also desired to dry so quickly as to prevent the recording paper from incidental staining with undried ink, and the coloring matter of ink fixed on the paper is desired not to fade out as long as possible.

In particular, the ink-jet recording system should satisfy the following requirements:

(1) Ink is quickly absorbed into recording paper.

(2) An ink dot, when overlapping a previously applied ink dot, does not disorder or diffuse it particularly in multicolor or full-color recording.

(3) Ink dots do not diffuse on recording paper so as not to be enlarged more than needs.

(4) The shapes of ink dots are close to a right circle and the perimeters of ink dots have smooth lines.

(5) Ink dots have high optical density and distinct perimeter lines.

(6) Recording paper has a high whiteness and a good contrast to ink dots.

(7) The color of ink does not vary depending upon recording paper used.

(8) Ink droplets scarcely scatter around the dots they form.

(9) Recording paper exhibits a high dimensional stability without being elongated or wrinkled after recording.

While it has been understood that the satisfaction of these requirements is much indebted to characteristics of recording paper, in practice there have hitherto been none of plain paper and specially finished paper that meet the above requirements. For example, the specially finished paper for ink-jet recording disclosed in Japanese Patent Kokai No. 74340/1977, though exhibiting a rapid absorption of ink, is liable to enlarge the diameters of ink dots and to make dim the perimeters of ink dots and exhibits a significant change in dimensions after recording.

SUMMARY OF THE INVENTION

The primary object of this invention is to solve the above problems unsolved by the prior art in the present technical field, in particular to provide a high performance recording paper which fulfills almost all the above-cited requirements in the recording with liquid ink by means of writing tools or ink-jet recording systems.

According to the present invention, there is provided a material used to bear writing or printing which comprises a substrate and a coating layer formed thereon from a coating material containing a polymer having both hydrophilic segments and hydrophobic segments.

DETAILED DESCRIPTION OF PREFERRED EMBODIMENTS

Figure 1:
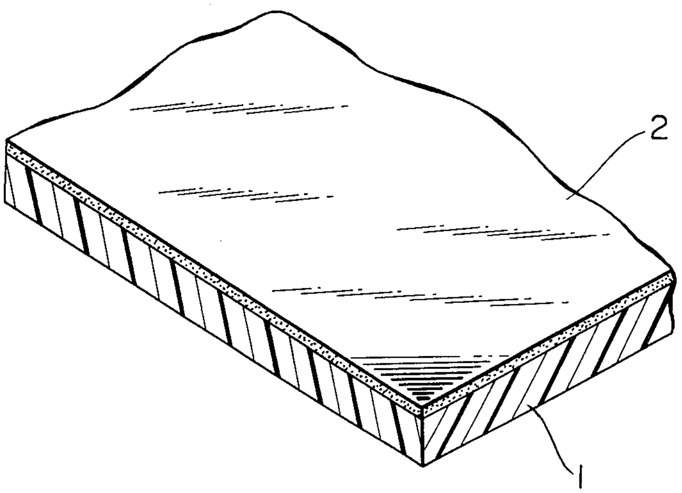
FIGS. 1 and 2 are illustrations outlining the structure of the recording paper of this invention.

Referring to the drawings and examples, this invention will be illustrated in detail.

In the first place, the construction of this invention is outlined with reference to FIG. 1.

In FIG. 1, numeral 1 represents the liquid-absorption substrate constituted of a porous material, as paper or cloth, or a plastic film or sheet. Numeral 2 represents the coating layer, which receives ink. The coating layer 2 is basically formed from a film-formable coating material containing mainly a polymer having both hydrophilic segments and hydrophobic segments. The coating material may mainly contain both a porous inorganic powder and a polymer having hydrophilic segments along with hydrophobic segments. Further, the coating material may mainly contain a polymer having both hydrophilic segments and hydrophobic and dye-attracting segments. Alternatively, the coating material may mainly contain both a porous inorganic powder and a polymer having hydrophilic segments along with hydrophobic and dye-attracting segments.

Such a polymer can be prepared chiefly from addition-polymerizable vinylic monomers. Hydrophilic segments comprising carboxyl or sulfo groups, or ester groups thereof are introduced in the polymer by using a prescribed amount of an $\alpha,\beta$-unsaturated monomer such as acrylic acid, methacrylic acid, crotonic acid, itaconic acid, an itaconic acid monoester, maleic acid, a maleic acid monoester, fumaric acid, a fumaric acid monoester, vinylsulfonic acid, sulfoethyl methacrylate, sulfopropyl methacrylate, or sulfonated vinylnaphthalene.

On the other hand, monomers most suitable for introducing the hydrophobic segments are styrene, styrene derivatives, vinylnaphthalene, vinylnaphthalene derivatives, and esters derived from aliphatic $C_8$–$C_{18}$ aliphatic alcohols and $\alpha,\beta$-ethylenic unsaturated carboxylic acids. In addition to these monomers, for example, the following monomers can be used for the same purpose: acrylonitrile, vinylidene chloride, $\alpha,\beta$-ethylenic unsaturated carboxylic acid esters other than the above esters, vinyl acetate, vinyl chloride, acrylamide, methacrylamide, hydroxyethyl methacrylate, hydroxypropyl methacrylate, glycidyl methacrylate, N-methylolacrylamide, N-butoxymethylacrylamide, and the like.

Monomers most suitable for introducing the hydrophobic and dye-attracting segments are, for example, acrylonitrile, vinylidene chloride, $\alpha,\beta$-ethylenic unsaturated carboxylic acid esters, vinyl acetate, vinly chloride, arylamide, methacrylamide, hydroxyethyl methacrylate, hydroxypropyl methacrylate, glycidyl methacrylate, N-methylolacrylamide, N-butoxymethylacrylamide, and the like. In addition to these monomers, there may be used styrene, styrene derivatives, vinylnaphthalene, vinylnaphthalene derivatives, and esters derived from aliphatic $C_8$–$C_{18}$ alcohol and $\alpha,\beta$-ethylenic unsaturated carboxylic acids.

In this invention, it is necessary to form a salt of the polymer prepared from a combination of the above-cited monomers, for the purpose of making the polymer soluble or colloidally dispersible in the medium of the coating material. Substances combined with the polymer to form the salt include alkali metals such as Na and K; aliphatic amines such as mono-, di-, and tri-methylamines and mono-, di-, and tri-ethylamines; alcoholamines such as mono-, di-, and tri-ethanolamines, mono-, di-, tri-propanolamines, methylethanolamine, and dimethylethanolamine; and morpholine and N-methylmorpholine.

A particularly important factor in the present polymer is the proportion of monomer units constituting the hydrophilic segments. When the content of monomer units containing carboxyl group or sulfo group, or ester group thereof, which constitute the hydrophilic segments, exceeds about 40% by weight of the polymer, the so-called sizing effect of the polymer on the substrate 1 is lowered and thereby the ink applied onto the coating layer 2 will blot thereon too much. In addition, the color density of ink fixed is low in this case because the concentration of color-adsorbing sites decreases. On the contrary, the content of hydrophilic monomer units less than 2% by weight lowers the binding force between the coating layer 2 and the substrate 1 making the coating layer 2 readily peelable.

Accordingly, the content of hydrophilic monomer units is preferably about 25 to 40% by weight.

The molecular weight of the polymer is desired to be at least about 2000 since the lower molecular weight deteriorate the film-forming property.

The polymer can be prepared, for instance, in the following way: Essential monomers are mixed in a prescribed ratio and polymerized to a desired molecular weight by a polymerization process such as solution polymerization, emulsion polymerization, or suspension polymerization using a polymerization regulator if necessary. Another acceptable process comprises preparing in the first place a polymer containing acid anhydride, ester, nitrile, or hydroxyl groups, followed by hydrolysis, esterification, sulfate-esterification, or sulfonation of these group, thereby forming hydrophilic groups, such as carboxyl and sulfo groups, in the polymer. The polymer in the form of amine salt may be prepared in any step of the polymer synthesis; for instance, it may be prepared by polymerizing monomer mixtures containing an amine salt of $\alpha,\beta$-unsaturated carboxylic acid or adding an amine after polymerization or hydrolysis as mentioned above.

In this invention, one or more of the polymers synthesized as described above are dissolved or dispersed in a solvent to prepare the coating material.

When the polymer is deficient in film-forming property, a binding resin can be incorporated thereinto. The binding resin may be water-soluble or organic solvent-soluble. Water-soluble resins suitable for this purpose include poly(vinyl alcohol), starch, casein, gum arabic, gelatin, polyacrylamide, carboxymethylcellulose, sodium polyacrylate, and sodium alginate. Organic solvent-soluble resins suitable include poly(vinyl butyral), poly(vinyl chloride), poly(vinyl acetate), polyacrylonitrile, poly(methyl methacrylate), poly(vinyl formal), melamine resins, polyamide resins, phenolic resins, polyurethane resins, and alkyd resins.

Solvents suitable for the coating material are water and mixtures of water with water-miscible organic solvents.

The water-miscible solvents include alcohols such as methanol, ethanol, n-propanol, isopropanol, n-butanol, sec-butanol, tert-butanol, isobutanol, furfuryl alcohol, and tetrahydrofurfuryl alcohol; ketones or ketoalcohols such as acetone, methyl ethyyl ketone, and diacetone alcohol; ethers such as tetrahydrofuran and dioxane; esters such as ethylene carbonate and propylene carbonate; and nitrogen-containing solvents such as N,N-dimethylformamide, N,N-dimethylacetamide, N-methyl-2-pyrrolidone, and diethanolamine.

The porous inorganic particles used jointly with the above-mentioned polymer in the coating material are primarily intended, in this invention, for physical adsorption and capture of the coloring matter (e.g., dye) of the ink applied onto the coating layer 2. Materials effectively used for this purpose are white porous inorganic pigments having an ionic property on the particle surface. Such pigments include natural zeolites, synthetic zeolites (e.g., molecular sieves mfd. by Union Carbide Corp.), diatomaceous earth, finely divided silica (average particle size up to 1$\mu$), powdered silica (average particle size up to 20$\mu$), and synthetic mica (represented by the formula $M.Mg_{2.5}(Si_4O_{10})F_2$, wherein M is hydrogen or metal atom).

In this invention, one or more kinds of these inorganic particles (generally particle sizes of microns to hundreds of microns) are dispersed in the coating solvent along with one or more of the above-mentioned polymers dissolved or dispersed.

The coating layer 2 can be formed by applying the coating material onto the substrate 1 in a known coating way (e.g., roll coating, rod bar coating, spray coating, or the like) so as to give a dry coating weight generally of ca.1–10 g/m$^2$, preferably of ca.2–5 g/m$^2$ from a more practical aspect. The coating material is then dried as soon as possible.

When ink is applied onto the coating layer 2, the coloring matter (e.g., dye) of the ink is selectively adsorbed and captured therein by forming ionic bonds, hydrogen bonds, or the like with the polymer and physical bonds with the porous inorganic particles.

Figure 2:
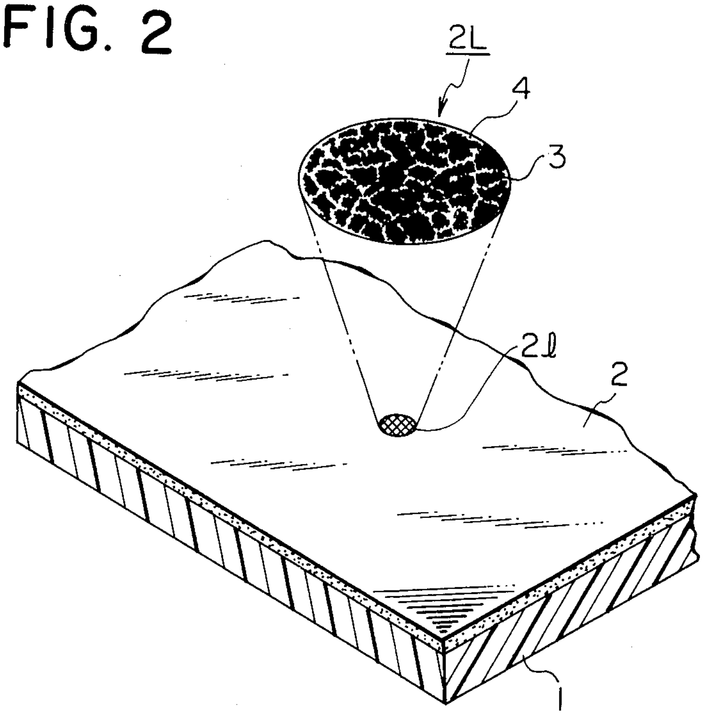

Furthermore, regulation of the composition of the coating material and the film-forming conditions, in particular the drying conditions after coating, gives a coating layer such as the following: As shown in FIG. 2-2L, which is a ca. 50-fold magnified view of part 2*l* of the coating layer 2 surface, numerous fine scale-like lamellae are two-dimensionally densely arranged, said lamellae being separated from one another by micro-cracks 4 running at random (mostly as deep as reaching the surface of the substrate 1). The dimensions or geometry of each scale-like lamellae 3 are not particularly limited but approximately 10$\mu$×10$\mu$ to hundreds $\mu$×hundreds $\mu$ in general. The width of each micro-crack 4 is also not particularly limited but usually several $\mu$. The dimensions or geometry of the scale-like lamellae 3 and the widths of the micro-cracks 4 can be varied at will within the above respective ranges by regulating or controlling the composition of the coating material and the film-forming conditions, in particular the drying conditions after coating.

When ink is applied onto the coating layer 2, the coloring matter (e.g., dye) of the ink is selectively adsorbed and captured in the scale-like lamellae 3 by forming ionic bonds or hydrogen bonds, or the like with the polymer and physical bonds with the porous inorganic particles, while the solvent of the ink passes through the micro-cracks 4 and is quickly absorbed into the substrate 1. Thus, the coloring matter of ink, on recording, is mostly captured by the upper-most zone of recording paper, so that excellent coloration of the applied ink is obtainable. On the other hand, the solvent of the ink rapidly moves through the micro-cracks to the underlying substrate, so that the ink on the paper surface is rapidly brought into an apparently dry state.

In addition, the scale-like lamellae 3 are particularly effective in preventing the applied ink dots from being enlarged more than needs or from being dim at the perimeters, thus giving ink dots of high optical density. This is caused by the intensive adsorption of the coloring matter of ink in the scale-like lamellae 3. The power of this adsorption principally depends upon chemical properties of the polymer (e.g., the ionic character) and physical properties of the inorganic particles (e.g., the voids).

It is undesirable that the surface area occupied by the scale-like malellae 3 of the whole surface area of recording paper is excessively small, in other words, the surface area occupied by the micro-cracks 4 is extremely large. In such a case, the efficiency of capturing the coloring matter is lowered, resulting in a poor coloration or low optical density of ink dots; the amount of ink migrating to the substrate 1 increases, giving rise to a so-called back penetration phenomenon of ink; and the shapes of ink dots become worse. Accordingly, the conditions leading to such a state of the coating layer should be avoided.

This invention will be illustrated in more detail with reference to Examples and the effect of this invention will be demonstrated.

Samples of the polymer, a main component of the coating layer in this invention, used in the Examples were prepared as shown in the following Preparation Examples or were the commercial ones shown below: In the Examples and Preparation Examples, "parts" means parts by weight.

PREPARATION EXAMPLE 1

A mixture of water (50 parts), isopropanol (30 parts), sodium dodecylbenzenesulfonate (0.5 part), and ammonium persulfate (0.5 part) was heated to 60° C. in a four-necked separable flask equipped with a stirrer and a dropping funnel. A mixture of styrene (5 parts), acrylic acid (9 parts), and butyl acrylate (5 parts) was added dropwise thereto from the dropping funnel over 60 minutes. After completion of the addition, the temperature was raised to 80° C. and the polymerization was conducted for 2 hours with stirring. The molecular weight of the polymer obtained was about 50,000.

PREPARATION EXAMPLE 2

Methyl methacrylate (8 parts), styrene (5 parts), itaconic acid (15 parts), benzoyl peroxide (1 part), lauryl mercaptan (1 part), diacetone alcohol (50 parts), and ethylene glycol (20 parts) were charged in the same flask as used in Preparation Example 1. The polymerization was conducted for 6 hours under a stream of nitrogen. The molecular weight of the polymer obtained was about 30,000.

In the following Preparation Examples, polymers were obtained from the following respective feeds in the same manner as in Preparation Example 2.

PREPARATION EXAMPLE 3

Styrene: 10 parts
Acrylonitrile: 5 parts
Methacrylic acid: 10 parts
Hydroxyethyl methacrylate: 5 parts
Azobisisobutyronitrile: 1 parts
Ethylene glycol monomethyl ether: 19 parts
Butanol 50 parts
(Molecular weight of polymer: ca. 15,000)

PREPARATION EXAMPLE 4

Vinylnaphthalene: 10 parts
N,N-Dimethyl-methacrylamide: 5 parts
Maleic anhydride: 10 parts
Methyl ethyl ketone peroxide: 1 parts
Isopropanol: 60 parts
Triethanolamine: 14 parts
(Molecular weight of polymer: ca. 20,000)

PREPARATION EXAMPLE 5

Styrene: 10 parts
Maleic anhydride: 10 parts
Diethanolamine: 2 parts
Azobisisobutyronitrile: 1 parts
Ethyl acrylate: 5 parts
Ethyl-carbitol: 23 parts
Diethylene glycol monomethyl ether: 50 parts
(Molecular weight of polymer: ca. 30,000)

PREPARATION EXAMPLE 6

Styrene: 5 parts
Itaconic acid monoethyl ester: 5 parts
Methacrylic acid: 10 parts
2-Ethylhexyl methacrylate: 10 parts
Benzoyl peroxide: 1 parts
Thiomalic acid: 1 parts
n-Propanol: 48 parts
Ethylene glycol: 20 parts
(Molecular weight of polymer: ca. 8,000)

Commercial Polymers a. Sodium naphthalenesulfonate-formalin condensation polymer:

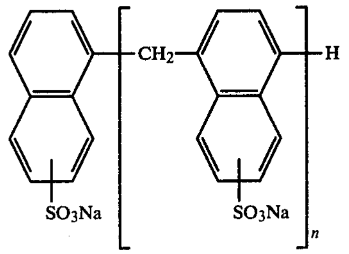

(n = 3-10)

Trade name: Demol N (Kao-Altal Inc.)
b. Diisobutylene-maleic acid copolymer
Trade name: Demol EP (Kao-Atlas Inc.)
c. Sodium polyacrylate
Trade name: Nopcosant R (San-Nopco Co., Ltd.)
d. Ammonium polyacrylate Trade name: Nopcosant RFA (San-Nopco Co., Ltd.)

e. Sodium polymethacrylate

Trade name: Primal 850 (Rohm & Haas Co.)

f. Styrene-maleic acid monoester ammonium salt copolymer

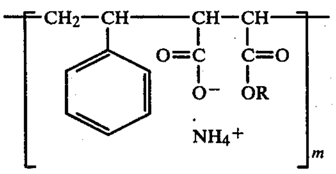

(m = 6–8)

Trade name: SMA Resin 1440H (Alco Chem. Co.)

g. Polyethylene glycol

Trade name: Macrogoal 1500 (Nippon Yushi Co., Ltd.)

h. Polethylene glycol-polypropylene glycol block copolymer

Trade name: Uniroope 40DP-50B (Nippon Yushi Co., Ltd.)

In the following Examples, a coating material (usually in slurry form) for forming the coating layer was applied to coat one side of base paper so as to give a dry coating weight of approximately 4 $g/m^2$.

Ink-jet recording tests in the following Examples, recording characteristics of recording paper samples were determined as follows:

The optical density of ink dot of the characteristics was determined by using a microdensitometer (PDM-5, mfd. by Konishiroku Photographic Ind. Co., Ltd.) with a $30\mu \times 30\mu$ slit at a recorded sample speed of 10 $\mu$/sec. in the x-axial direction and a chart speed of 1 mm/sec (speed ratio of sample to chart: 1/100).

The diameter of ink dots were measured by use of a microscope.

The fixation time for ink of the characteristics is the time passed from the application of an ink droplet onto a sample paper until the ink comes not to adhere to the surface of a rubber press roll placed at a definite position apart in the sample-forwarding direction from the ink-jetting head used; said time was determined by varying the sample speed, in other words, varying the time passed from the application of ink dot until the ink dot contacts with the rubber roll. The diameter of ink-jetting orifice of the ink-jetting head used was 50$\mu$.

EXAMPLE 1

The following compositions were thoroughly stirring and mixed severally to prepared five kinds of slurry:

Composition A

Polymer obtain in Preparation Example 1: 100 parts
Water: 150 parts

Composition B

Polymer obtained in Preparation Example 2: 100 parts
Water: 100 parts
Ethanol: 50 parts

Composition C

Polymer obtained in Preparation Example 6: 80 parts
Poly(vinyl alcohol): 20 parts
Water: 100 parts

Composition D

Demol N (a commercial polymer cited above): 70 parts
Gelatin: 20 parts
Water: 100 parts
Methanol: 20 parts

Composition E

SMA Resin 1440H (a commercial polymer cited above): 50 parts
Sodium alginate: 50 parts
Water: 150 parts The slurries were separately applied onto base paper (basis weight 60 $g/m^2$) and forcibly dried in the usual way to prepare Samples I–V or recording paper. Results of the ink-jet recording tests of these samples are summarized in Table 1. The ink used was of the following composition and properties:

Ink composition:
Water Black 187L (Orient Co.): 10 parts
Diethylene glycol: 30 parts
Water: 60 parts Ink properties:
Viscosity: 3.8 cps., as measured with a rotation viscometer (E-type, mfd. by Tokyo Keiki Co., Ltd.).
Surface tension: 53.4 dyne/cm, as measured with a plate-suspension type of surface tension meter (mfd. by Kyowa Kagaku Co., Ltd.).

TABLE 1

| Sample No. | Composition of slurry | Number of ink dots Superposed (note 1) | Recording characteristics: Optical density of ink dot | Diameter of ink dot ($\mu$) | Fixation time (sec.) | Image quality (note 2) |
|---|---|---|---|---|---|---|
| I | A | 1 | 0.85 | 110 | 0.9 | |
| | | 3 | 1.05 | 165 | 2.5 | ○ |
| | | 4 | 1.21 | 180 | 3.6 | |
| II | B | 1 | 0.88 | 100 | 0.7 | |
| | | 3 | 1.10 | 130 | 2.0 | ◎ |
| | | 4 | 1.25 | 155 | 2.6 | |
| III | C | 1 | 0.90 | 105 | 0.8 | |
| | | 3 | 1.12 | 130 | 2.4 | ◎ |
| | | 4 | 1.28 | 160 | 2.9 | |
| IV | D | 1 | 0.87 | 125 | 0.9 | |
| | | 3 | 1.10 | 140 | 2.6 | ○ |
| | | 4 | 1.26 | 185 | 3.8 | |
| V | E | 1 | 0.91 | 110 | 0.8 | |
| | | 3 | 1.15 | 135 | 2.3 | ◎ |

TABLE 1-continued

| Sample No. | Composition of slurry | Number of ink dots Superposed (note 1) | Recording characteristics: Optical density of ink dot | Diameter of ink dot (μ) | Fixation time (sec.) | Image quality (note 2) |
|---|---|---|---|---|---|---|
| | | 4 | 1.30 | 155 | 2.8 | |

Note 1: Number of ink droplets successively applied to the same point on the recording paper.
Note 2: Evaluation criteria
⊙excellent
○good

EXAMPLE 2

A slurry was prepared by thorough stirring and mixing the polymer (100 parts) obtained in Preparation Example 3, water (110 parts), and ethanol (50 parts). The slurry was applied onto base paper (basis weight 65 g/m$^2$) and dried under the same conditions as in Example 1 to prepare a recording paper sample.

The ink-jet recording tests of this sample gave nearly the same results as in the case of Sample V of Example 1.

EXAMPLES 3 AND 4

Sample II of recording paper prepared in Example 1 was tested for said ink-jet recording characteristics using inks of the following compositions: The results were as shown in Table 2:

Composition of ink:

Example 3

C.I. Direct Black 19: 5 parts

Ethylene glycol: 70 parts

Water: 25 parts

Example 4

Spilon Black GMH: 10 parts Triethylene glycol monomethyl ether: 40 parts

Ethanol: 50 parts

TABLE 2

| Example No. | Number of ink dots superposed (note 1) | Recording characteristics: Optical density of ink dot | Diameter of ink dot (μ) | Fixation time (sec.) | Image quality (note 2) |
|---|---|---|---|---|---|
| 3 | 1 | 0.80 | 80 | 0.8 | |
| | 2 | 1.01 | 90 | 1.6 | |
| | 3 | 1.21 | 95 | 1.9 | ⊚ |
| | 4 | 1.32 | 110 | 2.2 | |
| | 5 | 1.38 | 125 | 3.5 | |
| 4 | 1 | 0.82 | 80 | 0.8 | |
| | 2 | 1.10 | 88 | 1.5 | |
| | 3 | 1.21 | 105 | 2.0 | ⊚ |
| | 4 | 1.25 | 123 | 2.2 | |
| | 5 | 1.36 | 136 | 3.6 | |

Notes 1 and 2 are the same with those of Table 1.

EXAMPLE 5

Full-color ink-jet recording tests of Sample III of Example 1 by use of cyanin, magenta, yellow, and black inks gave nearly the same results as in the case of Sample III of Example 1 with respect to fixation time, optical density of ink dot, and diameter of ink dot. Thus, full-color photographs could be duplicated wherein all the colors were extremely clear and exhibited good reproducibility.

EXAMPLE 6

Writing tests by use of a commercial fountain pen were made on the Samples of recording paper prepared in Example 1. All the samples exhibited quick absorption of ink without ink running thereon, thus very beautiful letters being written.

EXAMPLE 7

A slurry was prepared by thorough stirring and mixing the polymer (100 parts) obtained in Preparation Example 1 and water (150 parts). The slurry was applied onto base paper (basis weight 60 g/m$^2$) and dried under the following five different conditions to prepare Samples VI–X of recording paper.

Drying conditions:

Sample VI: Natural drying by leaving the specimen standing.

Sample VII: In a 60° C. oven for 2 hours.

Sample VIII: In a stream of 90° C. hot air for 30 minutes.

Sample IX: In a stream of 110° C. hot air for 1 minute.

Sample X: In a stream of 180° C. hot air for 2 seconds.

Electron microscopic photographs (magnification factor 200) of coating faces of the samples are shown by FIGS. 3–7.

The samples thus obtained were tested for said ink-jet recording characteristics using the said ink as used in Example 1. The results are shown in Table 3.

TABLE 3

| Sample No. | Magnified appearance of coating face | Number of ink dots superposed (note 1) | Recording characteristics: Optical density of ink dot | Diameter of ink dot (μ) | Fixation time (sec.) | Image quality (note 2) |
|---|---|---|---|---|---|---|
| VI | FIG. 3 | 1 | 0.82 | 150 | 1.0 | X |
| | | 2 | 0.91 | 170 | 1.8 | |
| | | 3 | 1.00 | 200 | 3.2 | |
| | | 4 | 1.21 | 260 | 6.7 | |

TABLE 3-continued

| Sample No. | Magnified appearance of coating face | Number of ink dots superposed (note 1) | Recording characteristics: Optical density of ink dot | Diameter of ink dot (μ) | Fixation time (sec.) | Image quality (note 2) |
|---|---|---|---|---|---|---|
| | | 5 | 1.27 | 310 | 10.0 | |
| VII | FIG. 4 | 1 | 0.85 | 130 | 0.9 | Δ |
| | | 2 | 0.93 | 165 | 1.5 | |
| | | 3 | 1.07 | 200 | 2.7 | |
| | | 4 | 1.17 | 220 | 4.6 | |
| | | 5 | 1.28 | 270 | 8.2 | |
| VIII | FIG. 5 | 1 | 0.88 | 90 | 0.6 | Δ |
| | | 2 | 1.07 | 115 | 0.8 | |
| | | 3 | 1.18 | 126 | 1.5 | |
| | | 4 | 1.30 | 135 | 2.1 | |
| | | 5 | 1.36 | 150 | 3.1 | |
| IX | FIG. 6 | 1 | 0.90 | 95 | 0.5 | |
| | | 2 | 1.06 | 110 | 0.7 | |
| | | 3 | 1.23 | 115 | 1.0 | ○ |
| | | 4 | 1.32 | 123 | 1.5 | |
| | | 5 | 1.37 | 135 | 2.2 | |
| X | FIG. 7 | 1 | 0.90 | 90 | 0.3 | |
| | | 2 | 1.09 | 105 | 0.6 | |
| | | 3 | 1.20 | 113 | 1.0 | ◎ |
| | | 4 | 1.28 | 120 | 1.3 | |
| | | 5 | 1.36 | 125 | 1.7 | |

Note 1: the same with that of Table 1.
Note 2: Evaluation criteria:
excellent, good, Δ fair, X poor

EXAMPLE 8

A slurry was prepared by thorough stirring and mixing the polymer (100 parts) obtained in Preparation Example 3, water (110 parts), and ethanol (50 parts). The slurry was applied onto base paper (basis weight 65 $g/m^2$) and dried in a stream of 180° C. hot air for a few seconds to prepare a sample of recording paper.

Figure 7:
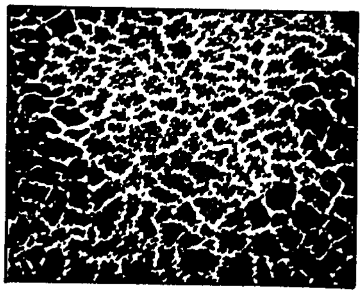

Electron microscopic photographs of the coating surface exhibited nearly the appearance as shown by FIG. 7.

The ink-jet recording tests of this sample gave nearly the same results as of Sample X of Example 7.

EXAMPLE 9

A slurry was prepared by thorough stirring and mixing the polymer (80 parts) obtained in Preparation Example 6, a poly(vinyl alcohol) (20 parts), and water (150 parts). Then, a sample of recording paper was prepared and tested in the same manner as in Example 8, giving nearly equal results.

EXAMPLES 10 AND 11

Sample X prepared in Example 7 was tested for ink-jet recording characteristics using the same inks as used in Examples 3 and 4, respectively. The results are shown in Table 4.

TABLE 4

| Example No. | Ink used | Number of ink dots superposed (note 1) | Recording Characteristics: Optical density of ink dot | Diameter of ink dot (μ) | Fixation time (sec.) | Image quality (note 2) |
|---|---|---|---|---|---|---|
| 10 | Same as | 1 | 0.80 | 80 | 0.3 | |
| | used in | 2 | 1.01 | 90 | 0.6 | |
| | Example | 3 | 1.21 | 95 | 0.9 | ◎ |
| | 3 | 4 | 1.32 | 110 | 1.2 | |
| | | 5 | 1.38 | 125 | 1.5 | |
| 11 | Same as | 1 | 0.82 | 80 | 0.2 | |
| | used in | 2 | 1.10 | 88 | 0.5 | |
| | Example | 3 | 1.21 | 105 | 0.9 | ◎ |
| | 4 | 4 | 1.25 | 123 | 1.2 | |
| | | 5 | 1.36 | 136 | 1.6 | |

Notes 1 and 2 are the same with those of Table 1.

EXAMPLE 12

Full-color ink-jet recording tests of Sample X of Example 7 by use of cyanin, magenta, yellow, and black inks gave nearly the same results as in the case of Sample X of Example 7 with respect to fixation time, optical density of ink dots, and diameter of ink dot. Thus, full-color photographs could be duplicated wherein all the colors were very clear and were good in reproducibility.

EXAMPLE 13

Writing tests by use of a commercial fountain pen were made on the recording paper prepared in Example 8. The recording paper exhibited quick absorption of ink without ink running thereon, thus very beautiful letters being written.

EXAMPLE 14

The following Compositions were thoroughly mixed and ground severally to prepare five kinds of slurry.

Composition F

Polymer obtained in Preparation Example 1: 100 parts
Silica powder: 50 parts
Water: 150 parts Composition G Polymer obtained in Preparation Example 2: 100 parts
Silica powder: 100 parts
Water: 100 parts
Ethanol: 50 parts Composition H Polymer obtained in Preparation Example 6: 80 parts
Diatomaceous earth: 80 parts
Poly(vinyl alcohol): 20 parts
Water: 100 parts Composition J Demol N (a commercial polymer cited above): 70 parts
Synthetic zeolite: 80 parts
Gelatin: 20 parts
Water: 100 parts
Methanol 20 parts Composition K SMA Resin 1440H (a commercial polymer cited above): 50 parts
Diatomaceous earth: 70 parts
Sodium alginate: 50 parts
Water: 150 parts Each slurry was applied onto base paper (basis weight 60 g/m$^2$) and forcibly dried to prepare Samples XI–XV of recording paper.

The samples were tested for the ink-jet recording characteristics using the same ink as used in Example 1. The results are shown in Table 5.

TABLE 5

| Sample No. | Composition of slurry | Number of ink dots superposed (note 1) | Recording characteristics: Optical density of ink dot | Diameter of ink dot ($\mu$) | Fixation time (sec.) | Image quality (note 2) |
|---|---|---|---|---|---|---|
| XI | F | 1 | 0.87 | 85 | 0.6 | |
| | | 3 | 1.07 | 100 | 1.5 | ◎ |
| | | 4 | 1.23 | 130 | 2.7 | |
| XII | G | 1 | 0.90 | 80 | 0.6 | |
| | | 3 | 1.12 | 105 | 1.8 | ◎ |
| | | 4 | 1.27 | 125 | 2.6 | |
| XIII | H | 1 | 0.92 | 83 | 0.8 | |
| | | 3 | 1.14 | 102 | 2.0 | ◎ |
| | | 4 | 1.30 | 130 | 2.9 | |
| XIV | J | 1 | 0.89 | 95 | 0.9 | |
| | | 3 | 1.12 | 110 | 2.6 | ○ |
| | | 4 | 1.28 | 135 | 3.8 | |
| XV | K | 1 | 0.92 | 83 | 0.7 | |
| | | 3 | 1.17 | 105 | 1.8 | ◎ |
| | | 4 | 1.32 | 120 | 2.6 | |

Note 1 and 2 are the same with those of Table 1.

EXAMPLE 15

A slurry prepared by thorough stirring and mixing the polymer (100 parts) obtained in Preparation Example 3, a silica powder (70 parts), water (110 parts), and ethanol (50 parts) was applied onto base paper (basis weight 65 g/m$^2$) and dried under the same conditions as in Example 14 to prepare a sample of recording paper. The ink-jet recording tests of this sample gave nearly the same results as in case of Sample XV of Example 14.

EXAMPLES 16 AND 17

Sample XI of recording paper prepared in Example 14 was tested for the ink-jet recording characteristics using the same inks as used in Examples 3 and 4, respectively. The results are shown in Table 6.

TABLE 6

| Example No. | Ink used | Number of ink dots superposed (note 1) | Recording Characteristics: Optical density of ink dot | Diameter of ink dot ($\mu$) | Fixation time (sec.) | Image quality (note 2) |
|---|---|---|---|---|---|---|
| 16 | Same as | 1 | 0.80 | 80 | 0.8 | |
| | used in | 2 | 1.01 | 90 | 1.6 | |
| | Example | 3 | 1.21 | 95 | 1.9 | ◎ |
| | 3 | 4 | 1.32 | 110 | 2.2 | |
| | | 5 | 1.38 | 125 | 3.5 | |
| 17 | Same as | 1 | 0.82 | 80 | 0.7 | |
| | used in | 2 | 1.10 | 88 | 1.5 | |
| | Example | 3 | 1.21 | 105 | 2.0 | ◎ |
| | 4 | 4 | 1.25 | 123 | 2.4 | |
| | | 5 | 1.36 | 136 | 3.6 | |

Notes 1 and 2 are the same with those of Table 1.

EXAMPLE 18

Full-color ink-jet recording tests of Sample XIII of Example 14 by use of cyanin, magenta, yellow, and black inks gave nearly the same results as in the case of Sample XIII of Example 14 with respect to the fixation time, optical density of ink dot, and diameter of ink dot. Thus, full-color photographs could be duplicated wherein all the colors were very clear and were good in reproducibility.

The samples were tested for the ink-jet recording characteristics using the same ink as used in Example 1. The results are shown in Table 7.

TABLE 7

Figure 3:
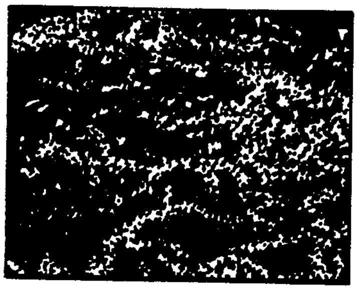
FIGS. 3-7 are traced copies of electron microscopic photographs of coating faces of present recording paper samples.
Figure 5:
Figure 4:
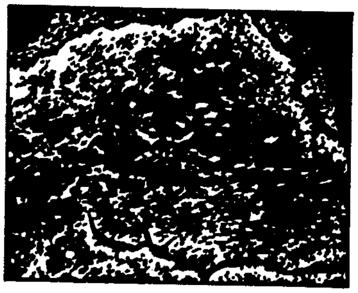
Figure 6:
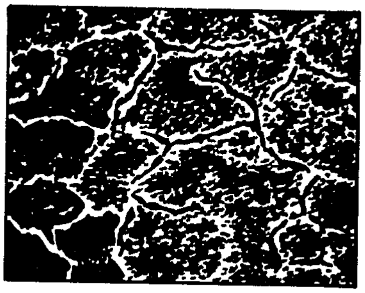

| Sample No. | Magnified appearance of coating face | Number of ink dots superposed (note 1) | Recording characteristics: Optical density of ink dot | Diameter of ink dot (μ) | Fixation time (sec.) | Image quality (note 2) |
|---|---|---|---|---|---|---|
| XVI | As shown in FIG. 3 | 1 | 0.86 | 150 | 1.0 | X |
| | | 2 | 0.95 | 160 | 1.5 | |
| | | 3 | 1.03 | 200 | 2.6 | |
| | | 4 | 1.28 | 260 | 6.3 | |
| | | 5 | 1.32 | 310 | 10.0 | |
| XVII | As shown in FIG. 4 | 1 | 0.88 | 140 | 0.9 | Δ |
| | | 2 | 0.96 | 155 | 1.7 | |
| | | 3 | 1.12 | 180 | 2.8 | |
| | | 4 | 1.24 | 220 | 5.5 | |
| | | 5 | 1.33 | 270 | 8.2 | |
| XVIII | As shown in FIG. 5 | 1 | 0.95 | 110 | 0.5 | Δ |
| | | 2 | 1.13 | 115 | 0.6 | |
| | | 3 | 1.26 | 120 | 1.3 | |
| | | 4 | 1.33 | 135 | 2.1 | |
| | | 5 | 1.41 | 150 | 3.0 | |
| XIX | As shown in FIG. 6 | 1 | 0.96 | 95 | 0.4 | |
| | | 2 | 1.15 | 110 | 0.6 | |
| | | 3 | 1.28 | 115 | 1.0 | ○ |
| | | 4 | 1.36 | 120 | 1.5 | |
| | | 5 | 1.43 | 130 | 2.0 | |
| XX | As shown in FIG. 7 | 1 | 0.95 | 90 | 0.3 | |
| | | 2 | 1.16 | 105 | 0.5 | |
| | | 3 | 1.28 | 115 | 1.0 | ◎ |
| | | 4 | 1.39 | 120 | 1.2 | |
| | | 5 | 1.45 | 125 | 1.6 | |

Notes 1 and 2 are the same with those of Table 3.

EXAMPLE 19

Writing tests by use of a commercial fountain pen were made on the samples of recording paper prepared in Example 14. All the samples exhibited quick absorption of ink, without ink running thereon, thus very beautiful letters being written.

EXAMPLE 20

A slurry was prepared by thorough stirring and mixing the polymer (30 parts) obtained in Preparation Example 1, a silica powder (50 parts), and water (150 parts). The slurry was applied onto base paper (basis weight 60 g/$m^2$) and dried under the following five different conditions to prepare Samples XVI–XX of recording paper:

Drying Conditions:

Sample XVI: Natural drying by leaving the specimen standing.

Sample XVII: In a 60° C. oven for 2 hours.

Sample XVIII: In a stream of 90° C. hot air for 30 minutes.

Sample XIX: In a stream of 110° C. hot air for 1 minute.

Sample XX: In a stream of 180° C. hot air for 2 seconds.

Electron microscopic photographs (magnification factor 200) of coating faces of the samples were not much different from those shown in FIGS. 3–7.

EXAMPLE 21

A slurry prepared by thorough stirring and mixing the polymer (50 parts) obtained in Preparation Example 3, diatomaceous earth (70 parts), and water (110 parts) was applied onto base paper (basis weight 65 g/$m^2$) and dried in a stream of 180° C. hot air for a few seconds to prepare a sample of recording paper.

Electron microscopic photographs of the coating surface exhibited nearly the same appearance as shown by FIG. 7.

The ink-jet recording tests of this sample gave nearly the same results as in the case of Sample XX of Example 20.

EXAMPLE 22

A slurry was prepared by thorough stirring and mixing the polymer (80 parts) obtained in Preparation Example 6, a synthetic zeolite (130 parts), a poly(vinyl alcohol)(20 parts), water (250 parts) and methanol (100 parts). Then, a sample of recording paper was prepared and tested in the same manner as in Example 21, giving nearly equal results.

EXAMPLES 23 AND 24

Sample XX prepared in Example 20 was tested for the ink-jet recording characteristics using the same inks as used in Examples 3 and 4. The results are shown in Table 8.

TABLE 8

| Example No. | Ink used | Number of ink dots superposed (note 1) | Recording Characteristics: Optical density of ink dot | Diameter of ink dot (μ) | Fixation time (sec.) | Image quality (note 2) |
|---|---|---|---|---|---|---|
| 23 | Same as used in Example | 1 | 0.82 | 80 | 0.3 | |
| | | 2 | 1.03 | 90 | 0.6 | |
| | | 3 | 1.21 | 98 | 1.0 | ◎ |

TABLE 8-continued

| Example No. | Ink used | Number of ink dots superposed (note 1) | Recording Characteristics: Optical density of ink dot | Recording Characteristics: Diameter of ink dot (μ) | Recording Characteristics: Fixation time (sec.) | Image quality (note 2) |
|---|---|---|---|---|---|---|
| | 3 | 4 | 1.35 | 110 | 1.3 | |
| | | 5 | 1.41 | 125 | 1.7 | |
| 24 | Same as | 1 | 0.85 | 85 | 0.2 | |
| | used in | 2 | 1.10 | 92 | 0.6 | |
| | Example | 3 | 1.23 | 110 | 0.9 | ◎ |
| | 4 | 4 | 1.29 | 128 | 1.2 | |
| | | 5 | 1.38 | 140 | 1.6 | |

Notes 1 and 2 are the same with those of Table 1.

EXAMPLE 25

Full-color ink-jet recording tests of Sample XX of Example 20 by use of cyanin, magenta, yellow, and black inks gave nearly the same results as in the case of Sample XX of Example 20 with respect to the fixation time, optical density of ink dots, and diameter of ink dot. Thus, full-color photographs could be duplicated wherein all the colors were very clear and were good in reproducibility.

EXAMPLE 26

Writing tests by use of a commercial fountain pen were made on the sample of recording paper prepared in Example 21. The sample exhibited quick absorption of ink without ink running thereon, thus very beautiful letters being written.

EXAMPLE 27

The following compositions were thoroughly stirring and mixed severally to prepare five kinds of slurry:

Composition L

Polymer obtained in Preparation Example 6: 100 parts
Water: 150 parts

Composition M

Polymer obtained in Preparation Example 4: 100 parts
Water: 100 parts
Ethanol: 50 parts

Composition N

Polymer obtained in Preparation Example 6: 80 parts
Poly(vinyl alcohol): 20 parts
Water: 100 parts

Composition P

Polymer obtained in Preparation Example 3: 70 parts
Gelatin: 20 parts
Water: 100 parts
Methanol: 20 parts

Composition Q

Polymer obtained in Preparation Example 4: 50 parts
Sodium alginate: 50 parts
Water: 150 parts The slurries were separately applied onto base paper (basis weight 60 g/m$^2$) and forcibly dried in the usual way to prepare Samples XXI–XXV of recording paper.

These samples were tested for the ink-jet recording characteristics using the same ink as used in Example 1. The results are summarized in Table 9.

TABLE 9

| Sample No. | Composition of slurry | Number of ink dots superposed (note 1) | Recording characteristics: Optical density of ink dot | Recording characteristics: Diameter of ink dot (μ) | Recording characteristics: Fixation time (sec.) | Image quality (note 2) |
|---|---|---|---|---|---|---|
| XXI | L | 1 | 0.87 | 95 | 0.7 | |
| | | 3 | 1.06 | 135 | 2.0 | ◎ |
| | | 4 | 1.23 | 150 | 2.8 | |
| XXII | M | 1 | 0.90 | 100 | 0.8 | |
| | | 3 | 1.10 | 140 | 2.3 | ◎ |
| | | 4 | 1.32 | 155 | 3.0 | |
| XXIII | N | 1 | 0.92 | 90 | 0.6 | |
| | | 3 | 1.15 | 130 | 1.8 | ◎ |
| | | 4 | 1.33 | 145 | 2.5 | |
| XXIV | P | 1 | 0.88 | 110 | 0.9 | |
| | | 3 | 1.12 | 155 | 2.7 | ○ |
| | | 4 | 1.28 | 185 | 3.6 | |
| XXV | Q | 1 | 0.90 | 105 | 0.9 | |
| | | 3 | 1.13 | 152 | 2.8 | ○ |
| | | 4 | 1.30 | 180 | 3.8 | |

Notes 1 and 2 are the same with those of Table 1.

EXAMPLES 28 AND 29

Sample XXIII of recording paper prepared in Example 27 was tested for the ink-jet recording characteristics using the same inks as used in Examples 3 and 4, respectively. The results are shown in Table 10.

TABLE 10

| Example No. | Ink used | Number of ink dots superposed (note 1) | Recording characteristics: Optical density of ink dot | Diameter of ink dot (μ) | Fixation time (sec.) | Image quality (note 2) |
|---|---|---|---|---|---|---|
| 28 | Same as | 1 | 0.80 | 80 | 0.8 | |
| | used in | 2 | 1.01 | 90 | 1.6 | |
| | Example | 3 | 1.21 | 95 | 1.8 | ◎ |
| | 3 | 4 | 1.32 | 110 | 2.0 | |
| | | 5 | 1.38 | 125 | 3.5 | |
| 29 | Same as | 1 | 0.82 | 80 | 0.7 | |
| | used in | 2 | 1.10 | 88 | 1.5 | |
| | Example | 3 | 1.21 | 105 | 1.9 | ◎ |
| | 4 | 4 | 1.25 | 123 | 2.2 | |
| | | 5 | 1.36 | 136 | 3.6 | |

Notes 1 and 2 are the same with those of Table 1.

EXAMPLE 30

Full-color ink-jet recording tests of Sample XXIII of Example 27 by use of cyanin, magenta, yellow, and black inks gave nearly the same results as in the case of Sample XXIII of Example 27 with respect to fixation time, optical density of ink dot, and diameter of ink dot. Thus, a full-color photograph could be duplicated wherein all the colors were extremely clear and were good in reproducilibity.

EXAMPLE 31

Writing tests by use of a commercial fountain pen were made on the samples of recording paper prepared in Example 27. All the samples exhibited quick absorption of ink without ink running thereon, thus very beautiful letters being written.

under the following five different conditions to prepare Samples XXVI–XXX of recording paper.

Dry conditions:

Sample XXVI: Natural drying by leaving the specimen standing.

Sample XXVII: In a 60° C. oven for 2 hours.

Sample XXVIII: In a stream of 90° C. hot air for 30 minutes.

Sample XXIX: In a stream of 110° C. hot air for 1 minute.

Sample XXX: In a stream of 180° C. hot air for 2 seconds.

Electron microscopic photographs (magnification factor 200) of coating faces of the samples were not much different from those shown in FIGS. 3–7.

The samples thus obtained were subjected to the ink-jet recording tests with the same ink as used in Example 1. The results are shown in Table 11

TABLE 11

| Sample No. | Magnified appearance of coating face | Number of ink dots superposed (note 1) | Recording characteristics: Optical density of ink dot | Diameter of ink dot (μ) | Fixation time (sec.) | Image quality (note 2) |
|---|---|---|---|---|---|---|
| XXVI | As shown | 1 | 0.82 | 150 | 1.0 | X |
| | in FIG. 3 | 2 | 0.91 | 170 | 1.8 | |
| | | 3 | 1.00 | 200 | 3.2 | |
| | | 4 | 1.21 | 260 | 6.7 | |
| | | 5 | 1.27 | 310 | 10.0 | |
| XXVII | As shown | 1 | 0.85 | 130 | 0.9 | Δ |
| | in FIG. 4 | 2 | 0.93 | 165 | 1.5 | |
| | | 3 | 1.07 | 200 | 2.7 | |
| | | 4 | 1.17 | 220 | 4.6 | |
| | | 5 | 1.28 | 270 | 8.2 | |
| XXVIII | As shown | 1 | 0.88 | 90 | 0.6 | Δ |
| | in FIG. 5 | 2 | 1.07 | 115 | 0.8 | |
| | | 3 | 1.18 | 126 | 1.5 | |
| | | 4 | 1.30 | 135 | 2.1 | |
| | | 5 | 1.36 | 150 | 3.1 | |
| XXIX | As shown | 1 | 0.90 | 95 | 0.5 | |
| | in FIG. 6 | 2 | 1.06 | 110 | 0.7 | |
| | | 3 | 1.23 | 115 | 1.0 | ◎ |
| | | 4 | 1.32 | 123 | 1.5 | |
| | | 5 | 1.37 | 135 | 2.2 | |
| XXX | As shown | 1 | 0.90 | 90 | 0.3 | |
| | in FIG. 7 | 2 | 1.09 | 105 | 0.6 | |
| | | 3 | 1.20 | 113 | 1.0 | ◎ |
| | | 4 | 1.28 | 120 | 1.3 | |
| | | 5 | 1.36 | 125 | 1.7 | |

Notes 1 and 2 are the same with those of Table 3.

EXAMPLE 32

A slurry was prepared by thorough stirring and mixing the polymer (100 parts) obtained in Preparation Example 6 and water (150 parts). The slurry was applied onto base paper (basis weight 60 g/m$^2$) and dried

EXAMPLE 33

A slurry prepared by thorough stirring and mixing the polymer (100 parts) obtained in Preparation Example 3, water (110 parts), and ethanol (50 parts) was applied onto base paper (basis weight 65 g/m$^2$) and dried in a stream of 180° C. hot air for a few seconds to prepare a sample of recording paper.

Electron microscopic photographs of the coating surface exhibited nearly the same appearance as shown by FIG. 7.

Ink-jet recording tests of this sample gave nearly the same results as of Sample XXX of Example 32.

EXAMPLE 34

A slurry was prepared by thorough stirring and mixing the polymer (80 parts) obtained in Preparation Example 4, a poly(vinyl alcohol) (20 parts), and water (150 parts). Then, a sample of recording paper was prepared and tested in the same manner as in Example 33, giving nearly equal results.

EXAMPLES 35 AND 36

The sample prepared in Example 33 was tested for the ink-jet recording characteristic using the same inks as used in Examples 3 and 4, respectively. The results are shown in Table 12.

TABLE 12

| Example No. | Ink used | Number of ink dots superposed (note 1) | Recording characteristics: Optical density of ink dot | Diameter of ink dot (μ) | Fixation time (sec.) | Image quality (note 2) |
|---|---|---|---|---|---|---|
| 35 | Same as | 1 | 0.80 | 80 | 0.3 | |
| | used in | 2 | 1.01 | 90 | 0.6 | |
| | Example | 3 | 1.21 | 95 | 0.9 | ◎ |
| | 3 | 4 | 1.32 | 110 | 1.2 | |
| | | 5 | 1.38 | 125 | 1.5 | |
| 36 | Same as | 1 | 0.82 | 80 | 0.2 | |
| | used in | 2 | 1.10 | 88 | 0.5 | |
| | Example | 3 | 1.21 | 105 | 0.9 | ◎ |
| | 4 | 4 | 1.25 | 123 | 1.2 | |
| | | 5 | 1.36 | 136 | 1.6 | |

Notes 1 and 2 are the same with those of Table 1.

EXAMPLE 37

Full-color ink-jet recording tests of the sample of Example 34 by use of cyanin, magenta, yellow, and black inks gave nearly the same results as in the case of Sample XXX of Example 32 with respect to fixation time, optical density of ink dot, and diameter of ink dot. Thus, full-color photographs could be duplicated wherein all the colors were very clear and were good in reproducibility.

EXAMPLE 38

Writing tests by use of a commercial fountain pen were made on the recording paper prepared in Example 33. The recording paper exhibited quick absorption of ink without ink running thereon, thus very beautiful letters being written.

EXAMPLE 39

The following compositions were thoroughly mixed and ground severally to prepare five kinds of slurry.

Composition R

Polymer obtained in Preparation Example 6: 100 parts
Silica powder: 50 parts
Water: 150 parts

Composition S

Polymer obtained in Preparation Example 4: 100 parts
Silica powder: 100 parts
Water: 100 parts
Ethanol: 50 parts

Composition T

Polymer obtained in Preparation Example 6: 80 parts
Diatomaceous earth: 80 parts
Poly(vinyl alcohol): 20 parts
Water: 100 parts

Composition U

Polymer obtained in Preparation Example 3: 70 parts
Synthetic zeolite: 80 parts
Gelatin: 20 parts
Water: 100 parts
Methanol: 20 parts

Composition V

Polymer obtianed in Preparation Example 4: 50 parts
Diatomaceous earth: 70 parts
Sodium alginate: 50 parts
Water: 150 parts Each slurry was applied onto base paper (basis weight 60 g/m$^2$) and forcibly dried in the usual way to prepare Samples XXXI–XXXV of recording paper.

These samples were tested for the ink-jet recording characteristics using the same ink as used in Example 1. The results are shown in Table 13.

TABLE 13

| Sample No. | Composition of slurry | Number of ink dots superposed (note 1) | Recording characteristics: Optical density of ink dot | Diameter of ink dot (μ) | Fixation time (sec.) | Image quality (note 2) |
|---|---|---|---|---|---|---|
| XXXI | R | 1 | 0.88 | 83 | 0.5 | |
| | | 3 | 1.07 | 93 | 1.8 | ◎ |
| | | 4 | 1.24 | 118 | 2.6 | |
| XXXII | S | 1 | 0.92 | 80 | 0.6 | |
| | | 3 | 1.11 | 98 | 2.1 | ◎ |

TABLE 13-continued

| Sample No. | Composition of slurry | Number of ink dots superposed (note 1) | Recording characteristics: Optical density of ink dot | Diameter of ink dot (μ) | Fixation time (sec.) | Image quality (note 2) |
|---|---|---|---|---|---|---|
| | | 4 | 1.33 | 112 | 2.8 | |
| XXXIII | T | 1 | 0.93 | 88 | 0.4 | |
| | | 3 | 1.16 | 100 | 1.6 | ◎ |
| | | 4 | 1.34 | 113 | 2.3 | |
| XXXIV | U | 1 | 0.89 | 92 | 0.7 | |
| | | 3 | 1.13 | 112 | 2.5 | ○ |
| | | 4 | 1.28 | 120 | 3.4 | |
| XXXV | V | 1 | 0.90 | 82 | 0.7 | |
| | | 3 | 1.13 | 96 | 2.3 | ○ |
| | | 4 | 1.30 | 115 | 3.2 | |

Notes 1 and 2 are the same with those of Table 1.

EXAMPLES 40 AND 41

Sample XXXIII of recording paper prepared in Example 39 was tested for the ink-jet recording characteristics using the same inks as used in Examples 3 and 4. The results are shown in Table 14.

TABLE 14

| Example No. | Ink used | Number of ink dots superposed (note 1) | Recording characteristics: Optical density of ink dot | Diameter of ink dot (μ) | Fixation time (sec.) | Image quality (note 2) |
|---|---|---|---|---|---|---|
| 40 | Same as | 1 | 0.80 | 80 | 0.8 | |
| | used in | 2 | 1.01 | 90 | 1.6 | |
| | Example | 3 | 1.21 | 95 | 1.8 | ◎ |
| | 3 | 4 | 1.32 | 110 | 2.2 | |
| | | 5 | 1.38 | 125 | 3.5 | |
| 41 | Same as | 1 | 0.82 | 80 | 0.7 | |
| | used in | 2 | 1.10 | 88 | 1.5 | |
| | Example | 3 | 1.21 | 105 | 1.9 | ◎ |
| | 4 | 4 | 1.25 | 123 | 2.2 | |
| | | 5 | 1.36 | 136 | 3.6 | |

Notes 1 and 2 are the same with those of Table 1.

EXAMPLE 42

Full-color ink-jet recording tests of Sample XXXIII of Example 39 by use of cyanin, magenta, yellow, and black inks gave nearly the same results as in the case of Sample XXXIII of Example 39 with respect to the fixation time, optical density of ink dot, and diameter of ink dot. Thus, full-color photographs could be duplicated wherein all the colors were very clear and were good in reproducibility.

EXAMPLE 43

Writing tests by use of a commercial fountain pen were made on the samples of recording paper prepared in Example 37. All the samples exhibited quick absorption of ink without ink running thereon, thus very beautiful letters being written.

EXAMPLE 44

A slurry was prepared by thorough stirring and mixing the polymer (30 parts) obtained in Preparation Example 6, a silica powder (50 parts), and water (150 parts) was applied onto base paper (basis weight 60 g/m$^2$) and dried under the following five different conditions to prepare Samples XXXVI–XXXX of recording paper:

Drying Conditions:

Sample XXXVI: Natural drying by leaving the specimen standing.

Sample XXXVII: In a 60° C. oven for 2 hours.

Sample XXXVIII: In a stream of 90° C. hot air for 30 minutes.

Sample XXXIX: In a stream of 110° C. hot air for 1 minute.

Sample XXXX: In a stream of 180° C. hot air for 2 seconds.

Electron microscopic photographs (magnification factor 200) of coating faces of the samples were not much different from those shown in FIGS. 3–7.

The samples were tested for the ink-jet recording characteristics using the same ink as used in Example 1. The results are shown in Table 15.

TABLE 15

| Sample No. | Magnified appearance of coating face | Number of ink dots superposed (note 1) | Recording characteristics: Optical density of ink dot | Diameter of ink dot (μ) | Fixation time (sec.) | Image quality (note 2) |
|---|---|---|---|---|---|---|
| XXXVI | As shown | 1 | 0.86 | 150 | 1.0 | X |
| | in FIG. 3 | 2 | 0.95 | 160 | 1.5 | |
| | | 3 | 1.03 | 200 | 2.6 | |
| | | 4 | 1.28 | 260 | 6.3 | |
| | | 5 | 1.32 | 310 | 10.0 | |
| XXXVII | As shown | 1 | 0.88 | 140 | 0.9 | Δ |
| | in FIG. 4 | 2 | 0.96 | 155 | 1.3 | |
| | | 3 | 1.12 | 180 | 2.2 | |

TABLE 15-continued

| Sample No. | Magnified appearance of coating face | Number of ink dots superposed (note 1) | Recording characteristics: Optical density of ink dot | Diameter of ink dot (μ) | Fixation time (sec.) | Image quality (note 2) |
|---|---|---|---|---|---|---|
| | | 4 | 1.24 | 220 | 5.5 | |
| | | 5 | 1.33 | 270 | 8.2 | |
| XXXVIII | As shown in FIG. 5 | 1 | 0.95 | 110 | 0.5 | Δ |
| | | 2 | 1.13 | 115 | 0.6 | |
| | | 3 | 1.26 | 120 | 1.3 | |
| | | 4 | 1.33 | 135 | 2.1 | |
| | | 5 | 1.41 | 150 | 3.0 | |
| XXXIX | As shown in FIG. 6 | 1 | 0.96 | 95 | 0.4 | |
| | | 2 | 1.15 | 110 | 0.6 | |
| | | 3 | 1.28 | 115 | 1.0 | ◎ |
| | | 4 | 1.36 | 120 | 1.5 | |
| | | 5 | 1.43 | 130 | 2.0 | |
| XXXX | As shown in FIG. 7 | 1 | 0.95 | 90 | 0.3 | |
| | | 2 | 1.16 | 105 | 0.5 | |
| | | 3 | 1.28 | 115 | 1.0 | ◎ |
| | | 4 | 1.39 | 120 | 1.2 | |
| | | 5 | 1.45 | 125 | 1.6 | |

Notes 1 and 2 are the same with those of Table 3.

EXAMPLE 45

A slurry prepared by thorough stirring and mixing the polymer (50 parts) obtained in Preparation Example 3, diatomaceous earth (70 parts), and ethanol (50 parts) was applied onto base paper (65 g/m$^2$) and dried in a stream of 180° C. hot air for a few seconds to prepare a sample of recording paper.

Electron microscopic photographs of the coating surface exhibited nearly the same appearance as shown by FIG. 7.

The ink-jet recording tests of this sample gave nearly the same results as in the case of Sample XXXX of Example 44.

EXAMPLE 46

A slurry was prepared by thorough mixing the polymer (80 parts) obtained in Preparation Example 4, a synthetic zeolite (130 parts), a poly(vinyl alcohol)(20 parts), water (250 parts) and methanol (100 parts). Then, a sample of recording paper was prepared and tested in the same manner as in Example 45, giving nearly equal results.

EXAMPLES 47 AND 48

The sample prepared in Example 45 was tested for the ink-jet recording characteristics using the same inks as used in Examples 3 and 4, respectively. The results are shown in Table 16.

TABLE 16

| Example No. | Ink used | Number of ink dots superposed (note 1) | Recording characteristics: Optical density of ink dot | Diameter of ink dot (μ) | Fixation time (sec.) | Image quality (note 2) |
|---|---|---|---|---|---|---|
| 47 | Same as used in Example 3 | 1 | 0.82 | 80 | 0.3 | |
| | | 2 | 1.03 | 90 | 0.6 | |
| | | 3 | 1.21 | 98 | 1.0 | ◎ |
| | | 4 | 1.35 | 110 | 1.3 | |
| | | 5 | 1.41 | 125 | 1.7 | |
| 48 | Same as used in Example 4 | 1 | 0.85 | 85 | 0.2 | |
| | | 2 | 1.10 | 92 | 0.6 | |
| | | 3 | 1.23 | 110 | 0.9 | ◎ |
| | | 4 | 1.29 | 128 | 1.2 | |
| | | 5 | 1.38 | 140 | 1.6 | |

Notes 1 and 2 are the same with those of Table 1.

EXAMPLE 49

Full-color ink-jet recording tests of the sample of Example 46 by use of cyanin, magenta, yellow, and black inks gave nearly the same results as in the case of Sample XXXX of Example 44 with respect to the fixation time, optical density of ink dot, and diameter of ink dot. Thus, full-color photographs could be duplicated wherein all the colors were very clear and were good in reproducibility.

EXAMPLE 50

Writing tests by use of a commercial fountain pen were made on the sample of recording paper prepared in Example 45. The sample exhibited quick absorption of ink without ink running thereon, thus very beautiful letters being written.

As described hereinbefore, this invention provides recording paper excellent in recording performance characteristics and best suited for multicolor ink-jet recording, particularly in the following respects:

The recording liquid (ink) applied onto the recording paper is quickly absorbed thereinto, that is to say, the coloring matter of ink is quickly fixed to the upper zone of the paper and the solvent of ink is also quickly absorbed into the underlying zone of the paper. Even when ink droplets different in color are applied successively in short periods of time to the same point of the paper face, no significant running or blotting of ink occurs thereon, in other words, the spread of ink dots can be inhibited within such an extent as not to impair the clearness of image, and thus good coloration is obtainable.

We claim:

1. A material used to bear writing or printing, which comprises a substrate of a recording paper suitable for ink jet recording and a coating layer formed thereon of a coating material containing a polymer having both hydrophilic segments and hydrophobic segments.

2. A material according to claim 1, wherein said coating material contains further porous inorganic powder.

3. A material according to claim 1, wherein said substrate is constituted of a porous material.

4. A material according to claim 1, wherein said hydrophobic segments of the polymer have the affinity for coloring matter including dye.

5. A material according to claim 1, wherein said coating layer is formed of a resin coating material capable of film-forming.

6. A material according to claim 1, wherein said coating layer is formed of a resin coating material capable of film-forming which contains a surfactant.

7. A material according to claim 1, wherein said coating layer is formed by coating the substrate with a coating material to give a dry coating weight of 1 to 10 $g/m^2$.

* * * * *

UNITED STATES PATENT AND TRADEMARK OFFICE

CERTIFICATE OF CORRECTION

PATENT NO. : 4,481,244

DATED : November 6, 1984

INVENTOR(S) : NASAHIRO HARUTA, ET AL.

It is certified that error appears in the above-identified patent and that said Letters Patent is hereby corrected as shown below:

On the Title Page:

under the Heading: Foreign Application Priority Data

Change the date of all the Japanese Priority documents from "Mar. 3, 1982" to --Feb. 3, 1982--.

Col. 1, line 37, after "it" insert -- , --;

line 40, change "needs" to --necessary--;

line 41, change "right" to --perfect--;

line 47, after "upon" add --the--;

line 57, change "none of" to --no--; and change "and" to --or--.

Col. 5, line 28, change "malellae" to --lamellae--.

Col. 8, line 9, change "obtain" to --obtaining--;

line 37, change "or" to --of--;

line 48, change "53.4" to --52.4--.

Col. 10, line 57, change "said" to --same--.

Col. 11, after Table 3, under "note 2: Evaluation criteria:" after "excellent" insert --◎--.

UNITED STATES PATENT AND TRADEMARK OFFICE

CERTIFICATE OF CORRECTION

PATENT NO. : 4,481,244

DATED : November 6, 1984

INVENTOR(S) : MASAHIRO HARUTA, ET AL.

It is certified that error appears in the above-identified patent and that said Letters Patent is hereby corrected as shown below:

Col. 20, in Table 11, last column under the Heading "Image quality (note 2)", change the symbol "◎" to -- O -- for Sample No. XXIX.

Col. 22, line 49, change "obtianed" to --obtained--.

Col. 25, in Table 15, last column under the Heading "Image quality (note 2)", change the symbol "◎" to -- O -- for Sample No. XXXIX.

Signed and Sealed this

Eighth Day of October 1985

[SEAL]

Attest:

DONALD J. QUIGG

*Attesting Officer*

*Commissioner of Patents and Trademarks—Designate*